Dec. 18, 1923.

G. O. CARTER ET AL

1,477,538

METHOD OF AND APPARATUS FOR WELDING METALS

Filed Aug. 5, 1920        5 Sheets-Sheet 1

Inventors:
Glenn O. Carter,
Raymond C. Pierce,
By Byrnes, Townsend & Brickenstein,
Attorneys.

Dec. 18, 1923.

G. O. CARTER ET AL

1,477,538

METHOD OF AND APPARATUS FOR WELDING METALS

Filed Aug. 5, 1920      5 Sheets-Sheet 5

Patented Dec. 18, 1923.

1,477,538

UNITED STATES PATENT OFFICE.

GLENN O. CARTER, OF NEW ROCHELLE, AND RAYMOND C. PIERCE, OF NEW YORK, N. Y., ASSIGNORS TO THE LINDE AIR PRODUCTS COMPANY, A CORPORATION OF OHIO.

METHOD OF AND APPARATUS FOR WELDING METALS.

Application filed August 5, 1920. Serial No. 401,319.

*To all whom it may concern:*

Be it known that we, GLENN O. CARTER and RAYMOND C. PIERCE, citizens of the United States, residing at 103 Leland Ave., New Rochelle, and 472 W. 144th St., N. Y. city, in the counties of Westchester and New York, respectively, both in the State of New York, have invented certain new and useful Improvements in Methods of and Apparatus for Welding Metals, of which the following is a specification.

This invention relates to an apparatus and method for welding metals and more particularly to an improved machine and method for progressively and continuously welding either the meeting or overlapping edges of work in the art commonly known as production welding, which involves the welding of a large number of duplicate pieces. Various novel features of the apparatus described are capable of independent application in welding equipment of a type differing from that herein disclosed and it is therefore, to be understood that this invention is in no sense limited to the particular arrangement and application nor to the details herein shown and described.

Autogenous welding operations, where manually performed, usually require skilled labor and are relatively slow and expensive, and the weld unions thus produced are likely to be of a variable character. In certain respects, however, the weld unions produced by a skilled manual welder are more satisfactory than welds heretofore produced automatically.

The objects of the present invention are, therefore, primarily to provide apparatus which will automatically produce a satisfactory welded union that does not require the use of highly skilled labor in the welding operation; to provide a machine that will produce such weld unions automatically, continuously and uniformly, and thereby reduce the welding cost and produce a more perfect weld and a more uniform product; to provide an apparatus which shall automatically feed fusible metal filling or welding material at a suitable rate to a region adjacent a heating means and to a joint to be welded and simultaneously move such heating means and such welding material back and forth across such joint in a manner that is more uniform than the usual manual welding operation; to provide an automatic welding apparatus that shall be readily controllable at the will of the attendant to interrupt the feed of the filling or welding material and also to enable the heating means to be easily and instantaneously withdrawn from adjacent the work and as readily again returned to its operative position; and especially to provide an improved automatically operable welding apparatus in the form of a unitary welding head comprising a gas-burning torch, such as an oxy-acetylene torch, welding wire feeding mechanism and means for supporting, driving, operating and adjusting such torch and such feeding mechanism and associated parts, mechanically arranged and balanced so that the assemblage shall be readily attachable as a unit to a suitable support on a machine for handling or feeding work to be operated upon.

Broadly speaking, the welding apparatus embodying the present invention comprises a suitable heating means, such as an oxy-acetylene welding torch, and mechanism for operating the torch in such a manner as to move the tip and flame thereof back and forth across the seam or union to be produced, together with means for continually feeding and guiding filling material such as a wire, to the region heated by said flame. The heating action of the flame is usually such as to produce a pool of molten metal for a short distance along the seam. The fusing end of the wire and the torch tip and flame impinging on the work are most desirably reciprocated back and forth along paths in the form of relatively short circular arcs intersecting the line of the weld, and the transverse movement of the torch and the feeding of the wire are concurrent with a movement of the work and the welding apparatus relatively to one another in a direction longitudinally of the weld union being produced. Accordingly, the fused metal is deposited upon the work along a substantially sinuous or curved path free from loops. The particular shape of the sinuous or undulating path that is defined, is determined as the occasion demands by adjusting the wire feed and the mechanisms for supporting and moving the torch and the wire guide. The movements of the flame and the end of the wire feeding into the pool are synchronous but opposite in phase and produce an agitation of the pool which serves to clear the latter of impurities so that the metal of the seam is of a very pure quality. The apparatus is also provided with means whereby the attendant may, with a minimum of manipulation, set means in operation to instantaneously withdraw the welding torch from adjacent the work for any reason, as to prevent damage.

The above and other objects and the novel features of this invention will be apparent from the following description taken in connection with the accompanying drawings which form a part of this application and in which—

Fig. 6 is a view partly in vertical section on the line 6—6 of Fig. 3 and partly in side elevation, illustrating the mounting for the heating means or torch and the wire guide, Fig. 6ª is a sectional view of a shield or sleeve for protecting part of the welding wire from the heat of the welding torch, Figs. 8 and 9 are perspective views of details of supporting and adjusting means for the torch and the filling wire guide, and a part of the oscillating means therefor.

Figures 3, 4, 5:
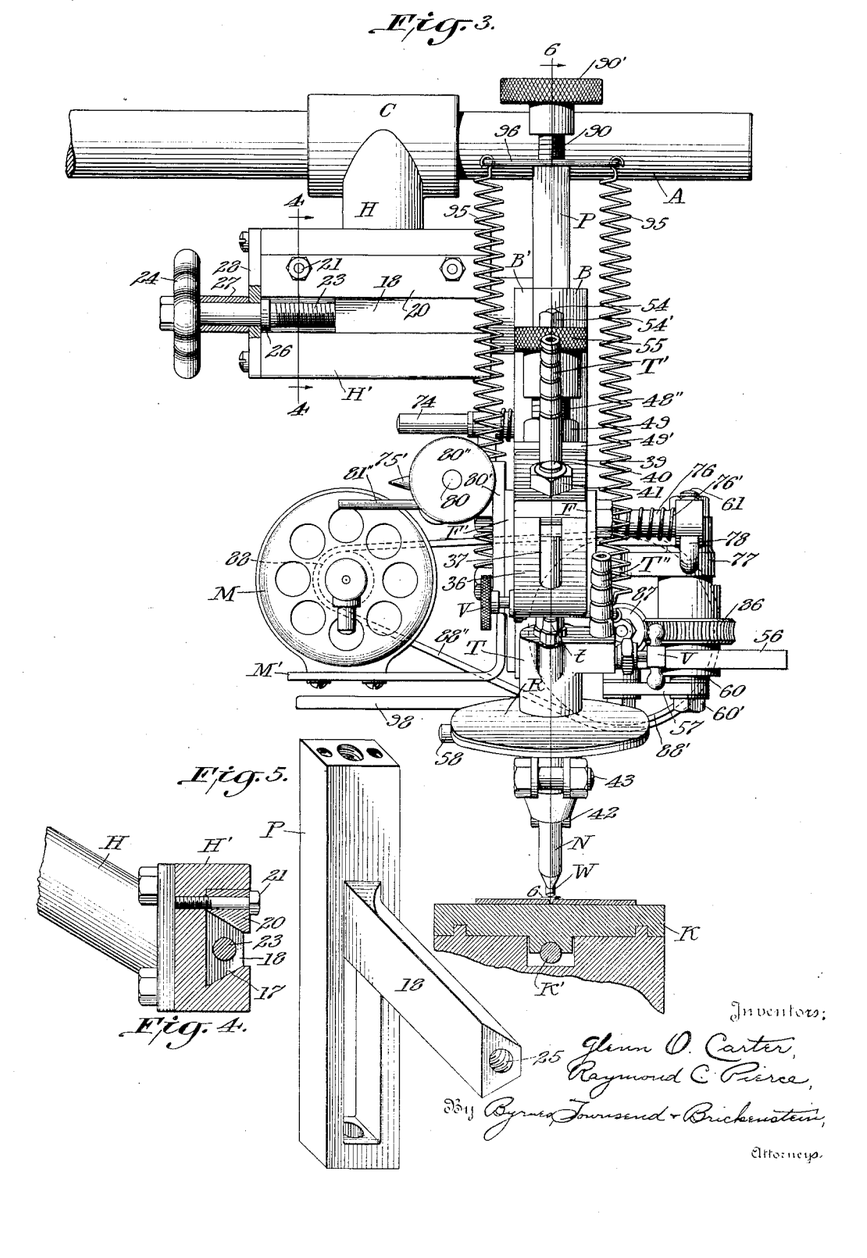
Figs. 4 and 5 are respectively, a sectional view on the line 4—4 of Fig. 3 and a perspective view, illustrating a part of the adjustable mounting means for the apparatus.

Referring to the drawing, the improved welding apparatus as herein disclosed comprises a unitary attachment mounted upon the arm A overhanging a table or carriage of a suitable machine K, shown diagrammatically in Fig. 3, and adapted to feed work having opposed or overlapping portions which it is desired to join together by a weld. However, it will be understood that such work feeding machine, except in so far as it cooperates with the present apparatus, forms no part of the present invention, may be of any suitable construction, and accordingly is only diagrammatically illustrated at K. Furthermore, while the apparatus embodying the present invention is disclosed as an attachment for such work feeding mechanism, it will be evident as the description proceeds, that the novel features and combinations disclosed may be incorporated in a suitable work feeding apparatus instead of being combined therewith as an attachment therefor.

In the drawings, A designates an arm or other suitable bracket on the work feeding machine or other means upon which the welding apparatus may be mounted or suspended by means of a suitable hanger H, the upper end of which has a hollow split T-connection clamping member C. The clamp C is provided with suitable means, such as bolts 15 and nuts 16, to rigidly and adjustably secure the hanger to the arm A in any desired position that the welding head is approximately to occupy. The horizontally disposed lower end of the hanger H, as best shown at H' in Figs. 3 and 4, has in its front face an undercut bearing groove 17 which is arranged to slidably receive an arm 18 desirably formed integrally on the adjustable mounting post P. The arm 18 has beveled upper and lower sides, one fitting in the undercut part of the groove 17 and being held in any adjusted position therein by means of a guide block 20 that is held in place in the groove and against the upper side of said arm by cap screws 21 passing therethrough and secured to the hanger member H'. The arm 18 and the post P carried thereby, are horizontally adjustable on the member H' by suitable means, such as a rod 23 which has a hand wheel 24 secured to its outer end for operating it and has threads which interfit with corresponding threads 25 in a longitudinal socket in the end of the arm 18. The rod 23 is suitably enlarged as at 26 to provide a shoulder or collar that abuts against the inner side of a thrust plate 28 secured to the hanger member H'. A spacing sleeve 27 on the rod 23, inserted between the thrust plate 28 and the handle 24, holds the collar 26 against the plate 28. Rotation of the rod 23 in either direction serves to slide the arm 18 and thereby adjust the post P and the mechanism carried by it in a horizontal direction, rendering it unnecessary to loosen the clamp C to adjust the welding head along the arm A every time a slight horizontal adjustment of the same is desired.

The post P carries suitable means for supporting the heating means or torch of the welding apparatus, the welding material or wire feeding means, the adjusting means for both the heating means and rod feeding means and in the present instance, also the driving means for operating such wire feeding means and for oscillating the wire guide and the heating torch which cooperate therewith and with the work to be welded.

Figure 7:
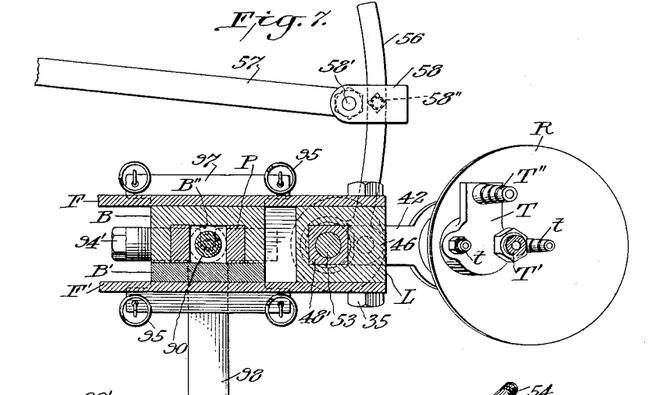
Fig. 7 is a view, partly in horizontal section on the line 7—7 of Fig. 6 and partly in top plan, illustrating the mounting for the torch and wire guide and a part of the mechanism for oscillating such torch and guide.
Figure 10:
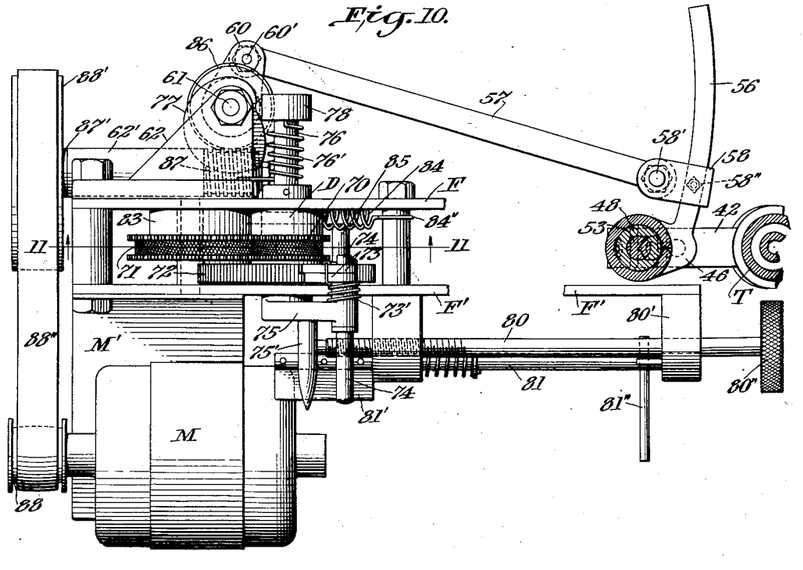
Fig. 10 is a top view of a part of the apparatus showing the driving mechanism for oscillating the heating means or torch and the wire guide, and the mechanism for feeding the wire to the torch, portions being broken out to more clearly illustrate the invention.

As shown, the above described parts of the apparatus are suitably supported upon the post P, as by means of a slidable box-like carrier B which is hollow as at B″ to slidably fit about the post P, the open side thereof being closed by means of a cover B′, as best shown in Fig. 7. The carrier B carries the frame structure which supports the heating means, the filler feeding and guiding means, and the means for operating the same and for oscillating said heating and said guiding means.

The supporting frame that is carried by the carrier B comprises a pair of frame plates F, F′, suitably secured, as by bolts, to opposite parallel faces of the carrier adjacent the lower end thereof, such plates projecting a considerable distance beyond the carrier and post on both sides thereof and being spaced apart at various points by sleeves and secured rigidly by bolts passing through such spacing sleeves. The forward ends of such plates carry the supporting means for the heating torch, the welding rod, guide and a portion of the means for oscillating and adjusting such torch and guide, and the rearwardly projecting parts carry the welding rod feeding means, the mechanism for operating such feeding means and a part of the aforesaid oscillating means. This simple arrangement of the several parts of the welding apparatus is not essential but is advantageous because it provides a unitary welding head that is substantially mechanically balanced with respect to its support, causing less strain and wear on various parts of the apparatus and accordingly, the apparatus will require less attention for adjustments and repairs and produce more uniform results than one in which the several elements are not so balanced.

As stated, the front end of the frame formed by the plates F, F′, supports a heating means in the form of a welding torch T having a flame nozzle or tip N and a welding or filling material guide G having an eye E for the passage therethrough of the filling material W which consists of a rod, strip or wire of suitable fusible and flexible metal that is fed from a supply reel (not shown) to a point adjacent to or in front of the outlet or outlets of the welding tip N, such tip being provided with a main gas passage N′ and, desirably but not necessarily, with an auxiliary or preheating gas passage N″ disposed above and communicating with the passage N′. The welding material or filler W may be fed through a guide to the torch flame from in front of the latter and at the desired rate, by suitable feeding mechanism D carried by the rearwardly projecting parts of the frame members F, F′, but such welding material may also be fed from behind the torch flame into the heated region adjacent the same. The frame members also support a bracket M′ which may carry suitable power or driving means, such as an electric motor M, connected to the movable parts of the apparatus in a suitable manner to effect the desired operation thereof.

A primary object of the present invention is to provide an apparatus which will automatically weld metal of any thickness, and especially adapted to successfully weld much thinner plates than have heretofore been successfully welded by machines. For this purpose the apparatus has been designed to produce the peculiar movements of the welding torch and welding wire best suited to form satisfactory welds. Such movements consist in rapidly moving the flame or tip of the torch and the end of the welding wire back and forth across the joint or seam to be welded and usually such movement is substantially a reciprocation of the flame in the same straight or curved path across the seam while the work is fed along past the torch flame and the welding wire, which latter is at the same time supplied to the heated flame region or pool in front of the flame to be fused and flowed into the seam. Where the work is stationary, the welding torch and wire, as they are moved back and forth across the seam, are simultaneously moved longitudinally of the seam as the welding progresses along the seam. If desired, the welding head and work may both be moved in opposite directions longitudinally of the seam to be produced. In any event, there is a relative longitudinal movement between the heating means and the wire feeding means and the work to be heated or welded, as well as a simultaneous movement transversely of the seam or weld union to be produced, and in all cases the path of the flame, fusing wire and resulting deposit of fused metal is along a substantially sinuous or undulating progressive path consisting of a series of contiguous but non-intersecting portions.

In the desirable arrangement herein shown, the welding head remains relatively stationary while the work is moved relatively thereto, the welding torch and welding wire simultaneously moving transversely of the joint or weld to be produced. The torch T may be mounted in any suitable manner on the frame F, F' so that its tip will be swingable across the work a sufficient distance to produce the desired heating effect. As illustrated, the torch and the wire guiding means together with a part of the oscillating or swinging mechanism and adjusting means therefor are mounted on the front end of the apparatus by means of a hollow mounting block L which is secured between the frame members F, F' by suitable bolts 35, 35 which also secure the forward ends of the members F, F' together. The torch T is yieldably mounted on the block L by means of a suitable rigid oxygen tube connection member T' which is rigidly secured to the upper end of the torch body and secured to a curved spring supporting plate 36. The plate 36 has a longitudinal slot 37 through which the connection tube T' extends, the said tube being firmly clamped to the plate in any position along the slot 37 by means of clamping members 38 and 39 which grip opposite sides of the plate 36 and have alined openings 38', 39' through which said tube T' extends. A bolt 40 pivoted near one end of the member 38 and extending through an opening near a corresponding end of the clamp member 39, has a projecting threaded end to receive a nut 41 bearing against the member 39. Said clamp members also have projections 38" and 39" in their opposed sides adapted to engage opposite sides of the plate 36. When the clamp is in place, these projections grip the plate 36, and the openings 38', 39' are thrown sufficiently out of line so their edges will bind against or grip said tube and thereby adjustably and detachably secure the torch to the mounting plate 36. The plate 36 is sufficiently flexible to support the torch T so that it may yield and assume the different positions into which it is swung by means of the oscillating mechanism to be described.

The torch may be provided with a suitable gas supply flexible tube connection T", see Fig. 3, which supplies suitable gas for heating and welding, in the present instance, being adapted to supply acetylene to be mixed with the oxygen supplied by the pipe T'. Connections t, t are provided to lead water or other cooling medium to and from the torch in cases where it is desirable to circulate such medium through a cooling jacket of the torch. Suitable valves v or other means, may be provided to regulate the supply of the gases. The mounting of the torch may be varied but the one illustrated is very desirable because the torch control valve handles have little or no motion while the torch tip may have an oscillating motion, thus enabling the attendant to easily adjust the gas supplies while the apparatus is in full operation. The fixed arrangement of the connections T' and T" is also of great practical importance, because the motion of the torch tip will have substantially no tendency to break or displace the flexible gas conduits connected thereto.

Figures 6, 6A, 8, 9:
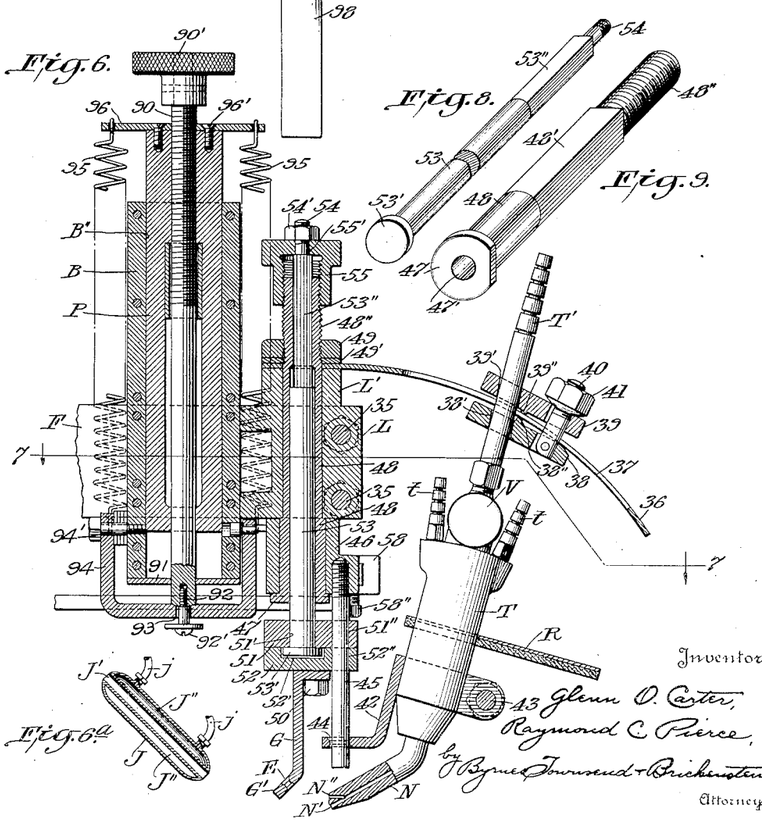

Suitable means may be provided for oscillating or moving the torch tip. A bracket 42 is clamped to the torch above its tip end by means of a bolt 43 and the free end thereof overhangs the tip N and is provided with an eye 44 which is substantially directly above the outlet of the tip. The eye 44 loosely receives the oscillating stud 45 which is secured in a threaded socket in the oscillating crank 46, as is best shown in Fig. 6. Oscillation of the crank 46 is transmitted through such stud to the lower end of the torch T and the tip N, and the flames issuing therefrom are thus reciprocated in a curved path of fixed radius. The number of oscillations may vary but it has been found that very satisfactory results are obtained by the use of 50 or more complete movements per minute. The oscillating crank is rockably supported between a head 47, on the lower end of a spindle or sleeve 48, and the under side of the supporting block L, the said sleeve being hollow and held against turning and in a fixed position by the rectangular portion 48' thereof that fits a similar rectangular opening in the block L, and also by a nut 49 that engages the threaded portion 48" adjacent the upper end thereof. The nut 49 also serves to fixedly secure the upper end of the torch supporting plate 36 to the block L, the said plate having an opening at its upper end to fit the upper end of the spindle 48 so that it may be clamped against a boss L' on the upper side of the supporting block L, a suitable washer 49' being interposed between the nut 49 and plate 36.

The supporting block L also carries the welding material or wire guide G which is secured by a bolt 50 to the lower of two plate members 51 and 52, the lower plate member having a recess 52' and the upper plate member having an opening registering therewith, such recess and opening being adapted to respectively receive the head 53' and shank of the adjusting spindle 53, whereby said guide G carried thereby is freely rockable about the axis of said spindle. As the guide G is rocked or oscillated, the wire W fed therethrough is guided and the end thereof swings back and forth in a curved path across the seam and may always be kept in front of the torch flame and most desirably so as to feed into the edge of the pool formed by the flame, at a point opposite the edge adjacent the flame. The spindle 53 is adjustably mounted within the opening 47' of the sleeve 48 and projects from both ends of the latter. As illustrated in Figs. 6, 7 and 8, the spindle 53 has a rectangular or squared portion 53" that is adapted to fit a corresponding squared portion of the opening 47' to prevent rotation of the spindle 53 but permit adjustment thereof longitudinally of the sleeve 48. The upper end of the spindle 53 has a reduced threaded portion 54 that projects through an opening 55' in the adjusting nut 55 and is adjustably connected thereto by a nut 54' which fits the threaded portion of the reduced end 54. The nut 55 is interiorly threaded to fit the threaded portion 48" of the stationary sleeve 48 and by turning the nut 55, the guide member G may be raised or lowered to vary the feeding position of the same with relation to the torch tip N. The guide supporting plates 51 and 52 are rockable about the axis of the spindle 53 and are provided with suitable alined openings 51" and 52" through which the oscillating stud 45 may pass and whereby said plates and the guide thereon may be oscillated. The wire guide G and torch are thus operatively connected together so that their movements will exactly synchronize.

It will be observed that the position of the eye of the wire guide G is such that the end of the wire and the flame issuing from the torch tip are at all times opposed and move synchronously but oppositely in phase about an axis between them and so that the wire will always be feeding into the liquid pool in front of the flame but will not be continuously subject to the intense heat or oxidizing tendency of the flame. This arrangement is a very desirable and important one in the present construction since by raising the metal or wire guide G the end of the wire approaches the torch, and by lowering the same the end of the wire passes into the molten bath at a distance farther from the torch. By moving the filling metal away from the intense heat of the flame, the amplitude of oscillation of the end of the wire is increased, thus reducing the period of time during which the filling metal is in line with the flame, resulting in less rapid fusion of the wire. Accordingly, these effects cooperate so as to require but little adjustment of the filling metal or wire with reference to the flame position to obtain any desired rate of fusion of the filling metal.

The eyes E and 44 may be flared at opposite ends thereof to prevent binding of the parts that work therein. The torch T also desirably carries a suitable asbestos-faced flame deflector R to prevent reflected heat from inconveniencing the attendant while he is adjusting the gas control valves.

Suitable mechanisms may be provided for operating the oscillating crank member 46 and for feeding the welding material or wire through the guide eye E, and such mechanisms may be driven from the same power means or separate power means mounted upon the welding head or mounted independently thereof.

In the present arrangement, the oscillation of the stud 45 and the crank member 46 which carries the same, is effected through a curved rocker arm 56 secured to and extending laterally from the crank 46. The arm 56 is secured to a connecting link 57 by means of an adjustable clamping device 58 which is pivotally connected to the end of the link 57 by a pin 58' and is adjustably attached at a suitable point along the arm 56 by means of a set screw 58", as best shown in Figs. 2, 6, 7 and 10. The point of adjustment of the clamp member 58 along the arm 56 determines the amplitude of the oscillation of the heating means or torch tip N, and also of the wire guide G, so that when the clamp member 58 is secured at a point close to the crank arm 46, the amplitude of oscillation will be substantially a maximum and as the clamp 58 is moved outwardly on the arm 56, the amplitude of oscillation is decreased, enabling any suitable swing or oscillation of the heating means and guiding means to be obtained. The other end of the connecting rod or link 57 is pivotally connected at 60' to the crank 60, and the latter is rotated about a spindle 61 which is mounted in a bracket 62 secured by bolts 63 to the outer side of the frame member F near the rear end thereof. As the crank 60 is rotated, the connecting link 57 is moved substantially longitudinally and imparts an oscillating motion to the arm 56 and crank 46, which is transmitted to the torch tip and wire guide by the mechanism already described.

The apparatus comprises suitable means for continuously feeding welding or filling material through the eye E to the region heated by the flame from the torch tip N. It will be understood that such welding material may be any suitable fusible metal in the form of a rod, wire or strip adapted to be drawn or fed from a supply reel of such material, (not shown) and accordingly in this specification, wherever the welding material is referred to as a welding wire, such designation is to be understood in its broader sense as either a flexible wire, strip or rod, or other suitable form of filling material for application to the work to be welded. The welding wire is fed by means of two feeding rolls or spools 70 and 71 which have meshing toothed flanges 70' and 71' and opposed knurled hardened gripping faces between such flanges adapted to engage and feed the welding wire. The feeding rolls 70 and 71 may be driven in any suitable manner as by means of a ratchet wheel 72 that is mounted on a bushing 72' connected to the bushing 70'' that carries the feeding roll 70. The ratchet wheel 72 may be rotated intermittently by means of one or more pawls 73 held against the ratchet wheel by a spring 73' and pivoted at 74 at the outer end of a pawl lever 75 which latter is mounted on a pawl lever operating shaft 76. The shaft 76 is desirably rockably mounted in the frame members F, F' and may be operated in any suitable manner, as by means of a cam 77 which rotates about the spindle 61 and engages a follower 78 or the outer end of the shaft 76. The cam 77, as it rotates, is so shaped that it cooperates with the follower 78 and imparts a rocking motion to the shaft 76, and the shaft 76 and the pawl operating lever 75 carried thereby, are rocked back and forth causing the ratchet wheel 72 to be rotated a portion of a revolution in a counter clockwise direction, thereby intermittently rotating the feed rolls 70 and 71 and feeding the welding wire W through the guide G. A spring 76' that surrounds the shaft 76 and has one end secured to the bracket 62 or other fixed support and the other end connected to the follower 78, exerts a force which will operate to retain the follower 78 in engagement with the cam 77. The pawl lever 75 is provided with a laterally extending stop pin 75' which, at the end of each return stroke of said lever, engages against the end of an adjusting screw 80 mounted in brackets 80' on the frame member F' and provided with a thumb piece 80'' whereby the said screw may be adjusted and the amount of feed per stroke of the pawl lever 75 may be varied as desired to provide for feeding varying cross sections and varying qualities of welding wire.

Means may be provided whereby the feeding mechanism may be readily interrupted so as to prevent further feeding of the welding wire, and as herein shown, a convenient means is provided which consists of a latch rod 81 that is turnable in the brackets 80' and carries a laterally extending blade 81' adjacent one end and a laterally extending handle 81'' adjacent the other end. The arrangement of the latch device 81 is such that by turning the arm 81'' upwardly about 90°, the blade 81' will also be turned up into a vertical position into the path of the outer extension of the stop pin 75' so that at the end of a feeding stroke toward the left, as viewed in Fig. 1, the blade 81' may be swung behind the pin 75' to hold the latter and the pawl lever 75 and shaft 76 in such position that the follower 78 at the outer end of the shaft 76 will not be operated by the rotating cam 77. The feeding mechanism may thus be readily interrupted and, by dropping the arm 81'' to its initial position, the feed mechanism may as readily again be thrown into operation.

Figure 11:
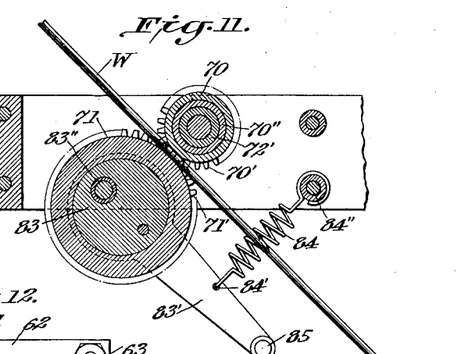
Fig. 11 is a vertical sectional view, taken on the line 11—11 of Fig. 10, illustrating the wire feeding means or rolls and the parts associated therewith.

Referring to Fig. 11, it will be observed that the feed roll 71 rotates upon a bushing 83 which carries a downwardly extending lever arm 83' and is eccentrically mounted in respect to the roll 71, as at 83''. Normally the roll 71 is held in mesh with the roll 70 by means of a spring 84 which, at its lower end, is secured at 84' at a point intermediate the ends of the lever 83' and at its upper end is fixedly connected to a frame bolt 84''. The spring 84 accordingly exerts a substantial pressure on the roll 71 to normally maintain suitable driving and feeding engagement between the wire W and the rolls 70 and 71, the toothed flanges 70' and 71' rolling approximately on their pitch circles when the smallest size filling metal is used. While the machine is idle or for the purpose of inserting a new or different welding wire and to quickly get its end to the point of application to the work it is desirable at times to separate the rolls 70 and 71. In order to do this, the outer end of the lever 83' is provided with a handle 85 by means of which the hub 83, eccentrically mounted at 83'' may be turned downwardly against the tension of the spring 84 to separate the roll 71 a sufficient distance from the roll 70 to release the gripping action of the rolls or to permit the removal or insertion of a wire or other filling material. The wire W rests on the knurled periphery of the roll 71 and when the latter is separated from the roll 70, the wire may be easily removed or adjusted. By means of the handle 85, a leverage that exceeds the tension of the spring 84 may be easily applied, to separate the feeding rolls, and when said handle is released, the feeding relation will be restored by the spring 84.

Figure 12:
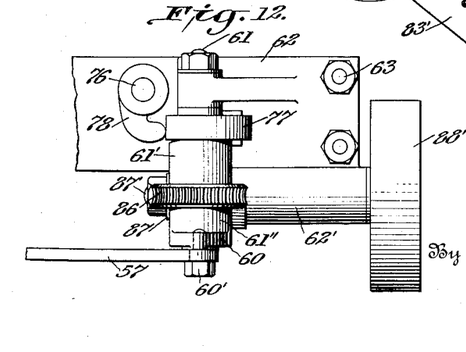
Fig. 12 is a side elevation of a portion of the mechanism for driving the torch and wire guide oscillating mechanism and the wire feeding mechanism.

The oscillating mechanism and wire feeding mechanism may be driven in any suitable manner, and as best shown in Fig. 12, the oscillating crank arm 60 and the wire feeding cam 77, may be operatively connected to a worm wheel 86, which is spaced from such arm and cam by suitable bushings 61', 61'', also rotatable about said spindle 61. The worm gear 86 is rotated by a worm 87 that meshes therewith and is carried on a suitable shaft 87' supported in a bearing 62' carried by the bracket 62. Suitable means may be provided for transmitting power to the shaft 87' and as herein shown, an electric motor M is connected by suitable means such as pulleys 88, 88' and the intermediate belt 88'' to the shaft 87'. The motor M and the worm gear 86 and its associated driven members being located on opposite sides of the longitudinal center line of apparatus, provide mechanism which is mechanically well balanced and therefore more reliable in operation and subject to less strain and wear.

At certain times in the operation of the welding apparatus, it is desirable to quickly withdraw the torch from adjacent the work to prevent damage, such as a "burn through" or for other reasons, and suitable mechanism is therefore provided for readily accomplishing this object and at the same time withdrawing the wire guide. In the present arrangement, best shown in Figs. 1, 3, 6 and 7, the carrier B and the frame carrying the heating means or torch and the wire guide means, are releasably latched in operative position and may readily be released manually at any instant to render means operative whereby they will instantaneously be automatically withdrawn from such operating position. As best shown in Fig. 6, the post P carries a threaded adjusting rod 90 which is provided at its upper end with a suitable handle or knurled thumb member 90' whereby it may be turned, and its lower end projects below the lower end of the post P and also through a central opening in the bottom plate 91 of the carrier B and has a latch pin 92 secured thereto. The latch pin 92 has a head 92' that is spaced from the lower end of the adjusting rod 90 to permit the intermediate shank of the pin 92 to fit into a recess 93 in a U-shaped latch member 94. The limbs of the latch member 94 are pivoted at 94' on opposite sides of the carrier B so that said member may be swung upwardly into horizontal position to release said carrier B and the parts of the apparatus carried by it. The carrier B is yieldably suspended under tension from the post P by suitable means such as the four helical springs 95 which at their upper ends are secured to a bracket 96 attached to the upper end of the post P by screws 96'. The lower ends of the springs 95 are secured adjacent the corners of a lower bracket 97 which is attached to the carrier B adjacent the lower end thereof. The latch member 94 is provided with an operating lever 98 whereby it may be swung outwardly to disengage the notch or slot 93 from the pin 92 and upon such disengagement, the springs 95, which are kept adjusted under tension by the adjusting rod 90, will operate to quickly lift the carrier B and the torch N, wire guide G and the other apparatus carried thereby. Accordingly, the latch means may be readily tripped and the flame may be quickly lifted away from the work by a simple manual operation and the apparatus may be as readily restored to operative position by forcing the carrier B downward against the tension of the springs 95, as by pressing down upon the head portion carrying the adjusting nut 55, until the latch member 94 may be swung into a position where the notch 93 fits the latch pin 92.

Figure 1:
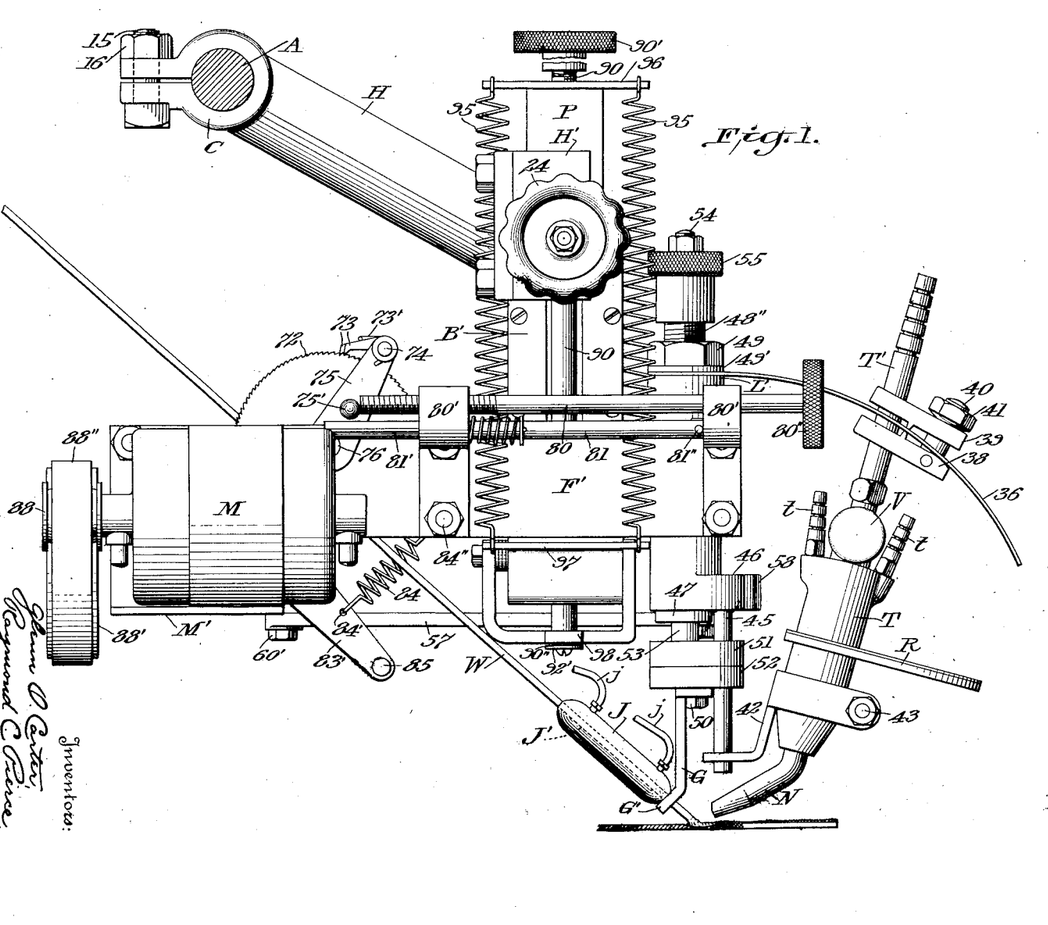
Figs. 1, 2 and 3 are respectively, side, top and front views of a welding apparatus embodying this invention.

Sometimes during the operation of the apparatus, some of the intense heat of the welding torch is deflected upwardly by the work and may at times be sufficient to soften the welding wire W before it reaches the eye E in the guide member G. This action may be undesirable, especially where smaller sizes of welding wire are used, and in order to shield the wire and protect it from the intense heat, we employ a suitable attachment which will prevent such heat from reaching portions of the wire above the guide G. A plain tube of steel, porcelain or other suitable heat resisting and radiating material may be employed, being made of sufficient inside diameter to receive and freely conduct therethrough the welding wire and of sufficient length to cover an extended length of the wire above the guide. As herein shown however, I employ a tube or sleeve like member J which has a central longitudinal passage J' of the necessary size to receive the wire, such passage being surrounded by a water jacket J" for cooling the sleeve, the water jacket being connected by connections j to a suitable supply of water or other cooling medium. Other means, such as longitudinal fins on the outer surface of the sleeve, may be provided for increasing the radiating surface and thereby cooling the sleeve. In mounting the attachment in position, the wire W, before it is passed through the eye E, is passed through the passage J' in the protecting attachment and then passed through the eye E. The tube J is then free to slide along the wire and its lower end is mounted on the rearwardly bent lower end G' of the guide G. The ends of the tube J are desirably rounded, as shown, so that either end thereof may be seated in the counter-sink of the eye E. The attachment adjusted in position on the present apparatus as shown in Fig. 1, effectively shields the welding wire from the heat of the heating means of the apparatus. It will be understood that the principles of this attachment may be employed in connection with other types of welding apparatus.

Figures 2, 13, 14:
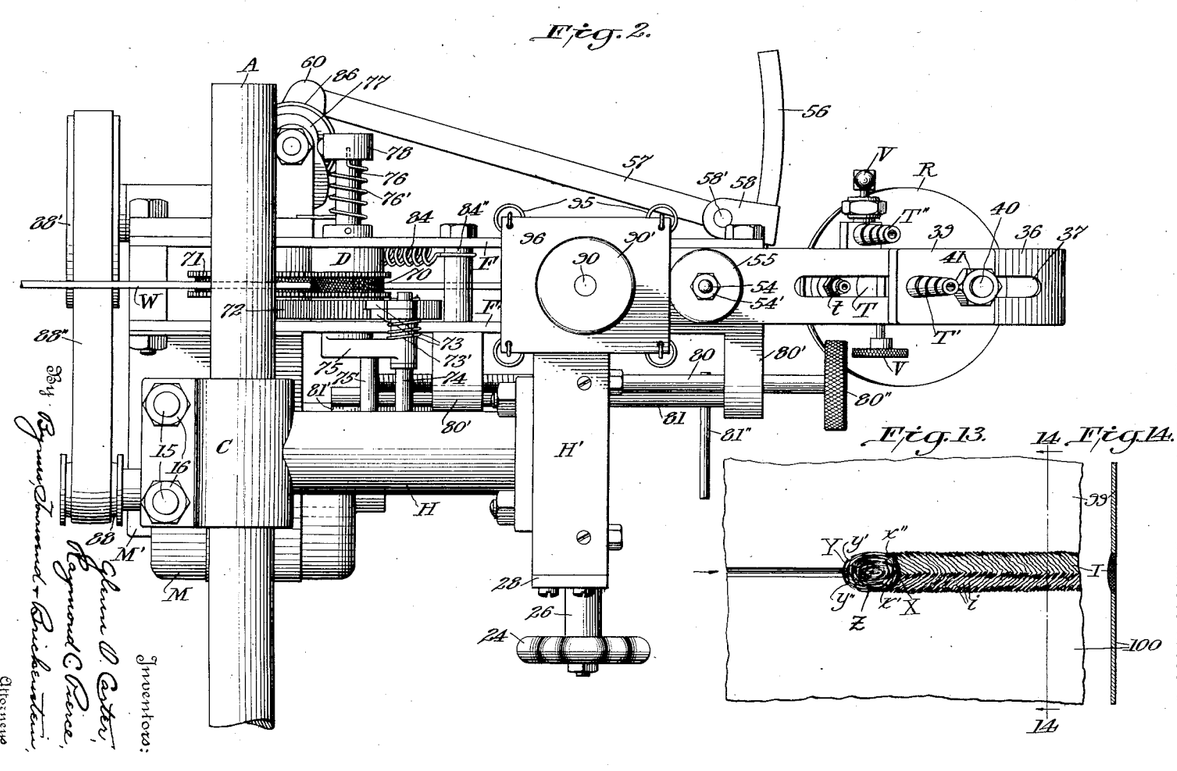
Fig. 13 is a plan view of portions of metal plates partly welded together, with a diagrammatic view of a molten pool of metal produced during the welding operation.
Fig. 14 is a cross-section on the line 14—14 of Fig. 13, illustrating an example of the actual thickness of metal plates which have been welded by the present improved apparatus and method, and the actual width and thickness of the weld produced.

It is believed that the adjustments, operation and advantages of the method and apparatus of this invention as disclosed will be clear from the foregoing description. As illustrated in Figs. 13 and 14, the apparatus is adapted to weld together, edge to edge, plates of varying thicknesses, and is suitable also for welding together plates which have lapping edges. With the oxy-acetylene and similar welding apparatus heretofore employed, it has been difficult, if not impossible, to weld thick plates, but with the present apparatus, perfect joints can be produced between relatively thick plates of metal. Fig. 14, to full scale, is an example of the exact thickness of metal plates 99, 100 welded together by apparatus embodying this invention and the exact cross section of a seam I between these plates. It has been found that by actual analysis of the metal of such seams, such metal is of a purer quality than the metal of the plates joined by the seam. This is probably due to the purifying action of the pool Z of molten metal which is maintained in a continual state of oscillation or agitation by the joint action of the heating flame and the end of the welding wire. For purposes of illustration, we have diagrammatically indicated in Fig. 13 the molten pool Z and the paths X and Y of the heating flame and end of the welding wire as now best known to us. It is probable that the pool Z is substantially oval shaped with the path X of the oscillation of the welding flame adjacent one end of the pool and the path Y of the oscillation of the end of the welding wire at the opposite end. The flame and end of the welding wire oscillate or reciprocate back and forth along the paths X and Y and about a center between these parts while the work or plates 99, 100 are fed at the proper rate in the direction of the arrow, Fig. 13. As shown, the length of the path X is approximately twice that of the path Y as this has been found to be a very desirable arrangement for some classes of work, but inasmuch as the heating torch and wire feed mechanism are adjustable, the relations between the paths X and Y may be varied as to the distance between them and the relative length of them. Since the torch and welding wire move about a center between the paths X and Y, they will move in substantially the same rotary direction at all times and will be opposite in phase, that is to say, when the flame is at $x'$, the end of the wire will be at $y'$ and similarly when the end of the flame is at $x''$, the end of the wire will be at $y''$. Accordingly, the end of the wire will only be in a direct line with the hottest part of the flame when they pass each other at the central portions of the paths X and Y but this will be for a very brief period because at that point both the flame and wire are moving faster than at any other point in their movement. The flame oscillating at one end of the pool and the wire at the opposite end of the pool thus exert a violent stirring action on the pool by changing the direction of oscillation 50 or more times a minute and the agitation thus produced throws impurities from the seam outwardly at opposite sides, and the pool is thus freed from impurities which would otherwise be retained in the seam and produce an imperfect or weak joint. By feeding the wire into the pool at a slight distance from the hottest part of the flame, the heat of the molten metal serves to finally fuse the softened welding wire and a more desirable weld is produced. Where the wire is fed directly into the flame, the latter has a tendency to oxidize the globules thereby fused off of the end of the wire, and deposits them directly on the seam and they are not subjected to the purifying action in the manner above described. As shown in Fig. 13, as the plates 99, 100 are fed along, the molten metal of the pool is gradually moved from beneath the heating flame, and in cooling, the surface of the weld appears as a substantially uniform series of wave or fish scale formations $i$, the outlines of which substantially follow the movements of the torch flame. The shape of the lines $i$ on the weld may be varied either by adjustment of the oscillating mechanism of the welding apparatus or adjustment of the rate of feed of the feeding apparatus, or both.

It has been found in practice that even when the gap between opposed edges is considerable, such edges will nevertheless be united by the cooperating oscillatory movements of the flame and wire, but in such cases, the weld sometimes is simply a metal lacing between the edges or plates, such lacing being defined by a similar deposit of metal along a sinuous or undulating path extending back and forth across the gap or seam. In certain classes of work, the wire feeding, guiding and oscillating mechanism may be omitted or thrown out of gear, as for example, in welding thin plates or work and where the edges to be united or welded together are cut so that they will accurately abut against one another. Under such conditions, the heating means or torch and flame are oscillated as heretofore described, to move the point of most intense heat back and forth across the seam and along a sinuous path with respect to the members to be heated, so as to define a sinuous path consisting of a series of approximately circular arcs free from loops and displaced from one another but alternately connected at their opposite ends to the adjacent arcs.

It will be understood that where no pre-heating is desired, the heating tip N may be replaced by a tip having only a single outlet or producing only a single flame jet. The auxiliary heating means N″ pre-heats the welding wire and thereby supplies heat to the work in addition to that supplied by the primary heating means N′. This additional heat supply renders the apparatus capable of operating rapidly and at a high efficiency at a wide range of thicknesses of metal. Other means may be employed to supply the desired additional heat to the filling material and work, as for example, a separate heating means or torch may be employed and operated in conjunction with the primary or main heating means or torch which produces the molten pool and completes the weld.

It will be evident from the foregoing, that the present disclosure is merely illustrative of the principles of the invention and that numerous features of the herein disclosed embodiment are not limited in their utility to oxy-acetylene welding equipment and may be varied without departing from the principles of the invention or sacrificing any of the advantages thereof, and therefore, the present invention, in its broader aspects, is not to be limited to the details shown and described.

We claim :—

1. Welding apparatus comprising means for heating a region embracing portions of the members to be welded, means for feeding filling material to a point within the heated region, and means for moving the heated part of the filling material along a sinuous path with respect to the members to be welded.

2. Welding apparatus comprising means for heating a portion of a seam to be welded, means for feeding filling material to a point in the heated portion, and means for moving the heated part of the filling material transversely of the seam.

3. Welding apparatus comprising means for heating a region wherein a weld is to be effected, means for feeding a wire of filling material to the heated region, a guide for the wire in proximity to the region to be heated and means for oscillating the guide transversely of the wire.

4. Welding apparatus comprising means for heating a seam to be welded, means for feeding filling strip material to a point heated by the heating means, means for oscillating the heated end of the filling strip across the seam, and means for regulating the amplitude of oscillation.

5. Welding apparatus comprising means for heating a seam to be welded, means for oscillating the heating means transversely of the seam, means for regulating the amplitude of oscillation, means for feeding filling strip material to a point heated by the heating means, and means for oscillating the heated end of the filling strip transversely of the seam, while keeping said end and the heating means in approximately opposite phases of oscillation at all times.

6. Welding apparatus comprising means for heating a seam to be welded, means for oscillating the heating means transversely of the seam, means for feeding filling material to a point heated by the heating means, and means for oscillating the heated part of said material transversely of the seam, while keeping said heated part and the heating means in approximately opposite phases of oscillation at all times.

7. Welding apparatus comprising a torch adapted to produce a pencil of flame, means for feeding a filling wire into proximity to the pencil of flame and means for moving the heated end of the wire to cause the line along which it is to fed to intersect the axis of the pencil of flame at frequent, regular intervals.

8. Welding apparatus comprising two members oscillating in circular arcs about a common axis, said arcs being situated on opposite sides of said axis, a welding torch attached to one of said members, and a guide for a wire of filling material being attached to the other of said members.

9. Apparatus of the class described comprising the combination of a frame, means for supporting the same above the work, a torch adjustably mounted on said frame, means carried by said frame for feeding welding material to the region heated by said torch, a motor carried by said frame adapted to operate such feeding means, and means for rendering such feeding means inoperative by said motor without stopping the motor.

10. Welding apparatus comprising a heating member, a flexible conduit connected with said heating member at a point remote from its active portion, and means for oscillating the active portion of the heating member while holding the junction of the heating member and the flexible conduit approximately stationary, whereby displacement of the conduit and damage to it are avoided.

11. Apparatus of the class described comprising, in combination, heating means and means for reciprocating such heating means along a curved path across the work to be heated.

12. Welding apparatus comprising, in combination, heating means, means for guiding filling or welding material to be fused and deposited in the region heated by said heating means, and means for operating said heating means and said guiding means so as to move said heating means and the portion of the filling material adjacent said heating means along paths extending back and forth across the joint or work to be welded.

13. Welding apparatus comprising, in combination, a welding torch, means for guiding a filling or welding rod to the region heated by a flame from said torch, and means for moving at least the tip of said torch and said guiding means so as to move the torch flame and the end of the welding rod across the joint or the work to be welded and in such relation that said filling or welding rod shall feed into the liquid pool in front of the flame from said tip in all positions of the latter.

14. Welding apparatus comprising, in combination, a welding torch, means for guiding filling material to the region or joint heated by a flame from said torch, means for regulating such guiding means, and means for operating said torch and said guiding means so as to move such torch flame and the fusing portion of such filling means back and forth across the joint to be welded.

15. Welding apparatus comprising, in combination, heating means, means for guiding filling material to the region or joint heated by said heating means, means for moving said heating means and said guiding means so that fused filling material will be deposited at the joint or work to be welded, and means for adjusting said heating means and such guiding means relatively to one another.

16. Welding apparatus comprising, in combination, heating means, means for guiding filling material to the region or joint heated by said heating means, means for moving said heating means and said guiding means so that fused filling material will be deposited at the joint or work to be welded, and means for adjusting such guiding means toward and away from said heating means and the work, whereby the ability of the heating means to fuse the filling material is varied.

17. Welding apparatus comprising heating means such as a torch, means for yieldingly mounting the same, and means for moving a part, at least, of such torch back and forth in a substantially fixed path across the work to be welded, such mounting means comprising a spring plate and means whereby the torch may be adjusted on said plate to adjust its tip to a desired inclination.

18. Welding apparatus comprising, in combination, a torch, means for yieldingly supporting said torch, and means for moving the tip of said torch across the seam or joint to be welded, said moving means comprising an oscillating member connected to the end of said torch adjacent the tip thereof.

19. Welding apparatus comprising, in combination, heating means, a guide for directing filling material to the region heated by said heating means, means for oscillating said heating means and guide simultaneously, and means for adjusting said guide longitudinally of its axis of oscillation.

20. Welding apparatus comprising, in combination, a heating torch, a guide adapted to direct welding wire to the region heated by said torch, a supporting member therefor, and means for reciprocating a part adjacent the end of said torch in a curved path and for swinging said wire guide about the axis of its supporting member.

21. The invention claimed in claim 20 in combination with a stud operatively connected to said supporting member and to the tip end of said torch, said reciprocating means comprising means for oscillating said stud about the axis of the wire guide supporting member.

22. The invention claimed in claim 21 in which the oscillating means for said stud comprises means whereby the amplitude of the oscillation of the stud may be varied within limits.

23. The invention claimed in claim 22 in which such amplitude varying means comprises a laterally extending arm carrying a driving means connection member that is adjustable longitudinally of the arm and toward and away from the center of oscillation of said stud.

24. Welding apparatus comprising, in combination, torch means, guiding means for welding material such as a wire, and means for supporting and adjusting said guiding means comprising a hollow sleeve exteriorly threaded at its upper end, a spindle projecting from the upper end of said hollow sleeve and an adjusting nut rotatably connected to said spindle and having screw threads interfitting with those on said hollow sleeve.

25. The invention claimed in claim 24 in combination with oscillating means supported by said hollow sleeve and arranged to oscillate said torch means and said guiding means.

26. Welding apparatus comprising, in combination, heating means such as a torch, means for guiding welding material such as a wire to the region heated by said heating means, and means for oscillating at least the tip of said torch and such wire feeding means, comprising a rockable crank operatively connected to the lower end of said torch and to such wire guiding means, a rotatable crank, and means for operatively connecting said cranks and for adjusting the amplitude of the oscillation imparted to such torch and wire guiding means.

27. Apparatus of the class described comprising the combination of a frame, means for supporting the same above the work, a torch adjustably mounted on said frame, means carried by said frame for feeding welding material to the region heated by said torch, a motor carried by said frame adapted to drive such feeding means, means for controlling such feeding means, and means on said frame for moving said torch away from the work.

28. Welding apparatus comprising, in combination, a torch, means for operating said torch to move the flame therefrom back and forth across the seam to be welded, means for guiding the welding strip toward said seam and flame, and means for moving the heated end of said strip back and forth across said seam.

29. Apparatus of the class described comprising the combination of a frame, supporting means therefor, a torch adjustably mounted on said frame, means carried by said frame for feeding welding material to the region heated by said torch, a motor carried by said frame adapted to drive such feeding means, means for rendering such feeding means inoperative by said motor without stopping the motor, and means for quickly moving said torch away from the work.

30. Welding apparatus comprising the combination of a frame, means for supporting the entire frame above the work, a torch mounted on said frame, means carried by said frame for feeding welding material to the region heated by said torch, an electric motor carried by said frame adapted to operate such feeding means, means for rendering such feeding means inoperative without stopping the motor, and automatically acting means on said frame for quickly moving said torch at will away from the work.

31. Welding apparatus comprising the combination with primary heating means for heating opposed parts of work to be welded, of means for moving such heating means across such opposed parts, means for moving said work relatively to said primary heating means, and auxiliary means whereby heat may be supplied to said parts before they reach the direct action of said primary heating means.

32. Welding apparatus comprising the combination with primary heating means, of auxiliary heating means, means for moving such heating means back and forth across the opposed edges of work to be welded, means for feeding said work during such movement of said heating means, said auxiliary heating means being adapted to supply heat to successive portions of the work before such portions receive the direct action of said primary heating means.

33. Welding apparatus comprising, in combination, a torch, means for operating said torch to move the flame therefrom back and forth across the seam to be welded, means for guiding a welding strip toward said seam and flame, and means for moving the heated end of said strip back and forth across said seam synchronously with the movement of said flame.

34. The invention claimed in claim 33 in combination with means whereby the flame and the heated end of said strip are moved in substantially opposite directions across said seam.

35. Welding apparatus comprising, in combination, a torch, means for operating said torch to reciprocate the flame therefrom back and forth across the seam to be welded, means for guiding a welding strip toward said flame and seam, and means for synchronously reciprocating the heated end of said strip in a substantially opposite direction back and forth across said seam.

36. Welding apparatus comprising, in combination, a frame, a torch carried thereby, means on said frame for feeding welding material to the region heated by said torch, a motor on said frame for driving such feeding means, and means located between said torch and said motor for supporting said frame and the mechanism carried thereby.

37. A welding head comprising, in combination, a frame, a torch carried thereby, means on said frame for feeding welding material to the region heated by said torch, a motor on said frame for driving such feeding means, and means disposed between said torch and said motor for suspending said frame, such suspending means comprising means adapted to adjust said torch relatively to the work.

38. Wire feeding means for welding apparatus comprising, in combination, cooperating operatively connected feeding rolls adapted to receive and feed a wire therebetween, means for driving such rolls comprising a rockable lever having a laterally extending projection, and means for interrupting said driving means comprising a manually operable latch adapted to be readily set so that it will engage said projection at the end of the stroke of said lever to interrupt transmission of driving power to said rolls.

39. Welding apparatus comprising, in combination, heating means such as a torch, means for feeding welding material such as wire to the region heated by said torch, means for moving said torch so as to throw the flame therefrom back and forth across the weld union to be produced and means for driving such wire feeding means and such torch moving means.

40. The invention claimed in claim 39 in which said driving means comprises a spindle carrying a member operatively connected to such torch moving means and carrying another member operatively connected to such wire feeding means.

41. The invention claimed in claim 39 in which such driving means comprises a spindle carrying a worm gear, a shaft carrying a worm meshing with said worm gear and power means for driving said shaft.

42. Welding apparatus comprising, in combination, a welding torch, means for feeding welding strip or wire to such torch, means for guiding such wire to the region heated by said torch, means for moving said torch so that the flame therefrom shall move back and forth across the weld union to be produced, means for moving such wire guiding means in unison therewith, means for operating said guide moving means and torch moving means and means for driving such wire feeding means and such operating means.

43. Welding means comprising, in combination, heating means, normally inoperative means for removing said heating means from adjacent the work, and releasable means for rendering such removing means operative.

44. Welding apparatus comprising a source of heat adapted to be brought into proximity with the work, means adapted to quickly remove the source of heat from the work when released, and means for readily releasing said removing means.

45. In apparatus of the class described, the combination of a torch for producing a flame adapted to be directed upon the work, normally inoperative means tending to move said torch to withdraw its flame from the work, and means for rendering the aforesaid means operative.

46. Welding apparatus comprising, in combination, heating means, means for guiding welding material to the region heated by said heating means, means for reciprocating said heating means adjacent and across the work to be welded, and quickly releasable automatically acting means for removing said heating means from adjacent the work.

47. The invention claimed in claim 46 in which such guiding means and heating means are relatively adjustable without interrupting the reciprocation of such heating means.

48. The invention claimed in claim 46 in which such guiding means is movable simultaneously with said heating means and in which such guiding means and heating means are adjustable relatively to one another without interrupting the movement of such guiding means or the movement of such heating means.

49. Welding apparatus comprising the combination of a welding torch, means for supporting said torch comprising a fixed post, a carrier slidable along said post and to which said torch is secured, an adjusting member connected to said post and projecting below said post and said carrier, a swingable latch member on said carrier provided with means for interengagement with a part of said adjusting member, plates secured to said post and to said carrier, springs connecting said plates and normally held under tension when said torch is in operative position and said latch member is in interengagement with said adjusting member, such springs being rendered operative by the disengagement of the latch member to move said carrier along said post and to move said torch away from the work.

50. Welding apparatus comprising a carrier, heating means such as a torch mounted thereon, a slide or post along which said carrier is adapted to move, spring means arranged to draw said carrier to one extremity of its travel along the slide, and a releasable latch adapted to hold the carrier at the opposite extremity of its travel against the tension of said spring means.

51. Welding apparatus comprising, in combination, work carrying means, means for heating a region embracing parts of the work to be welded, and means for moving such carrying means and such heating means so as to cause the movement of the region of most intense heating along a sinuous path with respect to the parts to be welded.

52. Welding apparatus comprising, in combination, means for heating a region embracing parts of the work to be welded, and means adapted to reciprocate the point of most intense heating back and forth along a curved path across the opposed edges of such parts.

53. Welding apparatus comprising, in combination, work carrying means, means for heating a region embracing parts of the work to be welded, means for guiding welding material to such region, means for moving such carrying means and such heating means so as to cause the movement of the region of most intense heating along a sinuous path with respect to the opposed edges of the parts to be welded, and means for operating such guiding means substantially in synchronism with the movements of such heating means.

54. Welding apparatus comprising the combination of primary heating means adapted to supply a flame for heating work to be welded, means for guiding welding material to the region of the work heated by said flame, means for moving said primary heating means and such guiding means back and forth across the line of weld, and auxiliary means for preheating said welding material before it reaches said region.

55. Welding apparatus comprising, in combination, primary heating means for heating a seam to be welded, means for guiding filling material to said seam at the region heated by such primary heating means, and auxiliary means for preheating such filling material before it reaches said region.

56. Welding apparatus comprising, in combination, primary heating means such as a flame jet for heating opposed parts to be welded, means for feeding and guiding welding wire to the region heated by said primary heating means, auxiliary heating means such as a flame jet for preheating said wire before it reaches said region, and means for moving the end of said wire and said jets transversely of said opposed parts.

57. Welding apparatus comprising, in combination, a torch having means for producing a main heating flame jet and a preheating flame jet, and means for feeding filling material such as a filling wire toward said torch and into regions heated by both of said jets.

58. Welding apparatus comprising the combination of heating means such as a torch, means for feeding welding material such as a wire to the region heated by said torch, a frame carrying said heating means and feeding means respectively, adjacent the opposite ends thereof, and supporting means for said apparatus connected to said frame intermediate the ends of the latter.

59. The invention claimed in claim 58 in which such supporting means comprises a device for mounting the apparatus on a machine, a post, and a laterally extending arm on said post adjustably mounted on such mounting device.

60. The invention claimed in claim 59 in which said mounting device comprises a clamping means at one end for adjusting it to a suitable machine frame, a part adjacent its other end having a groove to receive said laterally extending arm on said post, and adjusting means between such grooved part and said laterally extending arm.

61. Welding apparatus comprising, in combination, a torch, means for feeding welding material such as a wire to the region heated by said torch, carrying means for such torch and such wire feeding means comprising a frame supported intermediate such torch and such feeding means, and means mounted adjacent said wire feeding means for driving the latter.

62. Welding apparatus comprising, in combination, heating means such as a torch, means for moving said torch so as to move its flame back and forth across the opposed parts to be welded, means for feeding welding material such as a wire to the region heated by said torch, means for carrying said torch and such wire feeding means comprising a frame supported intermediate its ends, a motor carried by said frame on one side of said wire feeding means, and mechanism on said frame on the other side of said wire feeding means operatively connected to said motor and to said wire feeding means and torch moving means for transmitting power from such motor to drive such wire feeding means and move said torch.

63. Welding apparatus comprising, in combination, a frame comprising spaced parallel plates, a carrier therefor secured to said plates intermediate the ends thereof, a torch and wire guiding means connected to the forward ends of said plates, means for moving said torch so as to move its flame back and forth across the work and for moving said wire guide so as to move the end of the welding wire back and forth across the work and in opposite phase to the flame of said torch, wire feeding means mounted on said plates adjacent their rear ends, brackets on the rear ends of said plates, a motor mounted on one of said brackets, power transmitting means mounted on the other of said brackets and operatively connected to said wire feeding means and to the means for moving said torch and said wire guide, and means for operatively connecting said motor and said power transmitting means.

64. Welding apparatus, comprising, in combination, means for feeding work in a direction longitudinally of the seam or weld to be produced, heating means, and means for reciprocating such heating means back and forth in a curved path across the seam while said work is feeding.

65. Welding apparatus comprising, in combination, mechanism for feeding work in a direction longitudinally of the seam or weld to be produced, heating means, means for guiding filling means such as a wire to the region heated by such heating means, and means for reciprocating such heating means back and forth across said seam and for moving said guiding means so as to move the end of said filling wire back and forth across said seam, while the work is being fed.

66. Apparatus of the class described comprising, in combination, heating means, means for moving such heating means back and forth across the work to be heated and automatically operable means for withdrawing said heating means from its normal position adjacent the work.

67. Welding apparatus comprising, in combination, heating means, means for moving such heating means back and forth across the work to be heated, and manually releasable and automatically acting means for withdrawing said heating means from its normal position adjacent the work without interrupting the operation of such moving means.

68. Welding apparatus comprising, in combination, heating means, means for feeding welding wire to the region heated by said heating means, means for guiding said welding wire, means for moving said heating means and such guiding means, driving means for such moving means and such feeding means, and means for adjusting such feeding means without interrupting such moving means.

69. The method of welding that comprises causing a relative movement between heating means and work to be heated and welded, substantially in the direction of the seam to be produced, supplying filling means to said work, and simultaneously reciprocating such heating means and filling means back and forth across such seam.

70. The method of welding that comprises moving work to be heated substantially in the direction of the seam to be produced and simultaneously reciprocating heating means back and forth along a curved path across such seam.

71. The method of welding that comprises feeding work to be heated in the direction of the seam to be welded, reciprocating a part of a torch back and forth in a curved path across such seam while the work is feeding, and feeding and guiding welding material such as a strip or wire toward said torch so as to always maintain the end of such strip or wire in the molten pool in front of the torch flame.

72. The method of welding that comprises moving heating means such as a flame back and forth across opposed parts of work to be welded, supplying welding material to the region heated by said heating means, and preheating such welding material as it is supplied to said region.

In testimony whereof, we affix our signatures.

GLENN O. CARTER.
RAYMOND C. PIERCE.